United States Patent [19]

Naito et al.

[11] Patent Number: 5,170,088
[45] Date of Patent: Dec. 8, 1992

[54] DRIVING STRUCTURE FOR ELECTRONIC PARTS IN A MECHANISM

[75] Inventors: Koichi Naito; Kazumasa Ohnishi; Toru Nakazawa, all of Nagaoka, Japan

[73] Assignee: Alps Electric Co., Ltd., Tokyo, Japan

[21] Appl. No.: 713,581

[22] Filed: Jun. 11, 1991

Related U.S. Application Data

[63] Continuation of Ser. No. 496,472, Mar. 20, 1990, abandoned.

[30] Foreign Application Priority Data

Jun. 23, 1989 [JP] Japan .............................. 1-73982[U]
Jun. 30, 1989 [JP] Japan .............................. 1-77141[U]

[51] Int. Cl.$^5$ ............................................ H01L 41/08
[52] U.S. Cl. .................................... 310/323; 200/181; 338/74; 310/328
[58] Field of Search ................. 310/323, 328; 200/181; 338/74

[56] References Cited

U.S. PATENT DOCUMENTS

| | | | |
|---|---|---|---|
| 4,613,782 | 9/1986 | Mori et al. | 310/323 |
| 4,742,260 | 5/1988 | Shimizu et al. | 310/323 |
| 4,784,323 | 11/1988 | Miller | 310/323 |
| 4,857,791 | 8/1989 | Uchino et al. | 310/328 X |
| 4,882,500 | 11/1989 | Iijima | 310/323 |
| 5,013,958 | 5/1991 | Ohnishi et al. | 310/323 |
| 5,036,245 | 7/1991 | Ohnishi et al. | 310/323 |
| 5,087,851 | 2/1992 | Nakazawa et al. | 310/323 |

FOREIGN PATENT DOCUMENTS

| | | |
|---|---|---|
| 61-183980 | 8/1986 | Japan . |
| 63-11070 | 1/1988 | Japan . |
| 773714 | 4/1979 | U.S.S.R. . |
| 773715 | 4/1979 | U.S.S.R. . |

Primary Examiner—Mark O. Budd
Attorney, Agent, or Firm—Guy W. Shoup; Paul J. Winters

[57] ABSTRACT

The present invention relates to a driving mechanism for an electronic part such as a switch, a variable resistor, etc., which can be remote-controlled, wherein an ultrasonic motor is used as a driving source for the electronic part. Therefore the object thereof is to provide a driving mechanism for an electronic part, which produces no electromagnetic noise and for which the construction can be simplified by omitting a converting mechanism and a controlling mechanism.

2 Claims, 4 Drawing Sheets

DRIVING STRUCTURE FOR ELECTRONIC PARTS IN A MECHANISM

This application is a continuation of application Ser. No. 07/496,472, filed Mar. 20, 1990 now abandoned.

BACKGROUND OF THE INVENTION

The present invention relates to a driving structure for electronic parts, which, utilizing driving force of an actuator, effects drive of a switch. The conduction state among a plurality of conductors of the switch which are arbitrarily contacted and separated with and from each other is switched over by remote control. Moreover, the actuator effects drive of a variable resistor, whose resistance is varied by moving a slider along a resistor, etc.

Hereinbelow prior art techniques will be explained, taking a switch and a variable resistor as prior art examples.

Heretofore, there is known a switch e.g. provided with a driving shaft rotated around the axial line by an actuator, a conductor plate, which is mounted on this driving shaft and rotated therewith, and a fixed plate disposed opposite to this conductor plate and supported rotatably with respect to the driving shaft, in which the conduction state between different contacts on the fixed plate is switched over by rotating the driving shaft by a predetermined amount, in a state where the rotation of the fixed plate is restricted, so that a plurality of contacts (conductors) disposed on the surface of the fixed plate and the conductor plate are selectively brought into contact.

In a switch constructed as described above, usually a rotary type motor is used as the actuator stated above.

Further a type of switches other than the rotary type of switches described above is also provided, in which the conduction state among a plurality of fixed conductors disposed separately from each other is switched over by moving a movable conductor linked with an actuator along a straight line therebetween. Also in this case, a rotary type motor is used as the actuator. The rotation of this motor is transformed into a linear movement by means of a driving mechanism to move the movable conductor described above.

Further, recently, as variable resistors used in a sliding volume, etc. in an audio device, one type is widely utilized, in which a slider is in contact with a resistor extending linearly in a conductive state and the resistance between two terminals, which are kept to be conductive through the resistor and the slider, is varied by moving the slider in the extending direction of the resistor by means of an actuator linked through the driving mechanism.

For the driving mechanism used in such a variable resistor, as described e.g. in JP-A-Sho 55-117208, there is known one, in which a rotary type motor is used as an actuator, the rotation of which is transmitted to a pulley through reduction means such as a worm gear, etc. and in this way a belt or a wire wound around the pulley stated above is forwarded so that the slider secured to the belt, etc. is moved linearly.

However, in the prior art switches described above, since a motor is used as an actuator, in order to locate a conductor such as the rotating plate, etc. at a desired position with a high precision against the inertia of the shaft of the motor, etc., it is necessary to disposed a control mechanism, which detects the rotational angle on the rotating plate, the position of the movable conductor, etc. by means of position detecting means such as a rotary encoder, a linear encoder, etc. to control the rotational angle of the motor shaft and furthermore it is necessary to disposed a stopping mechanism, which restricts the movement of the rotating plate, etc. stopped at a predetermined position. For this reason they had a drawback that the construction of the device is complicated, which causes increase in the size and the weight, which in turn raises the cost of the device.

Further they had another drawback that the motor produces electromagnetic noise, which causes erroneous operations of electronic devices or precision apparatuses, in which the switch is mounted.

Furthermore, in the prior art variable resistor described above, since a motor was used as an actuator, it had drawbacks as described below.

(1) Since the motor generates electromagnetic noise, it is necessary to take some measures against noise in order to interrupt influences of the noise on the working signal of the device (e.g. sound signal in an audio device).

(2) Since it is necessary to dispose a driving mechanism for converting the rotation of the motor into a linear movement of the slider, the construction of the whole is complicated and increases the size, which in turn causes rise in the fabrication cost.

(3) It is necessary to dispose a control mechanism to control the rotational angle of the motor shaft, in order to position the slider with a high precision to obtain a desired resistance. In this case, since the inertia of the motor shaft and various members constituting the driving mechanism acts at decelerating the motor shaft to stop it, the reponse to the control signal is bad. In addition, the resolving power is also worsened due to accumulated errors in the driving mechanism described above.

(4) Since a worm gear is used in the driving mechanism converting the rotational movement of the motor shaft into the linear movement of the slider, in the state where the slider is linked with the driving mechanism, the self-stopping action of the worm works, which inhibits manual operation of the slider. Consequently, in the case where the variable resistor is used in a device, for which manual operation is probable, such as a volume regulator in an audio device, it is necessary to dispose separately a mechanism for interrupting the linkage between the driving mechanism and the slider at need.

SUMMARY OF THE INVENTION

The present invention has been done in view of the situations described above and the object thereof is to provide a driving mechanism for electronic parts, which is small and light and produces no electromagnetic noise.

In order to achieve the above object, according to the present invention, an ultrasonic motor is used as an actuator, in which an oscillating element is disposed on an oscillating body made of an elastic material, the oscillating element exciting the oscillating body, so that the oscillating element generates a longitudinal oscillation and a bending oscillation at an end portion of the oscillating body, by which oscillations an elliptic oscillation producing a driving force is synthesized, the driving force moving a conductor.

By the construction described above the resistance is varied either by switching over the conduction state between different conductors or by moving the slider by means of the driving force of the ultrasonic motor. In this way no electromagnetic noise is produced. Consequently the present driving mechanism can be used in precision apparatuses and electronic devices, which are relatively easily affected by electromagnetic noise, without any problem and in addition quietness is increased, because working noise produced by the ultrasonic motor itself is in the ultrasonic region outside of the audible region.

Further, since friction force acts between constituent members subjected to the driving force of the ultrasonic linear motor and the last, when electric current supply to the ultrasonic linear motor is stopped, it is possible to stop rapidly the movement of the slider by utilizing this friction force to suppress this movement. For this reason the response to the control signal is improved.

Furthermore, since the slider is held by the friction force between the ultrasonic linear motor and the constituent members subjected to the driving force thereof, the control mechanism can be simplified and in addition it is not necessary to dispose a mechanism for holding the conductors at fixed positions. If this friction force is set so as to be in a domain, where it doesn't exceed the force necessary for the operator to manipulate the slider, the slider can be either manually or by means of an actuator without disposing any special mechanism therefor.

DETAILED DESCRIPTION OF THE INVENTION

EMBODIMENT 1

Hereinbelow the first embodiment of the present invention will be explained, referring to FIGS. 1 and 2.

Figure 1:
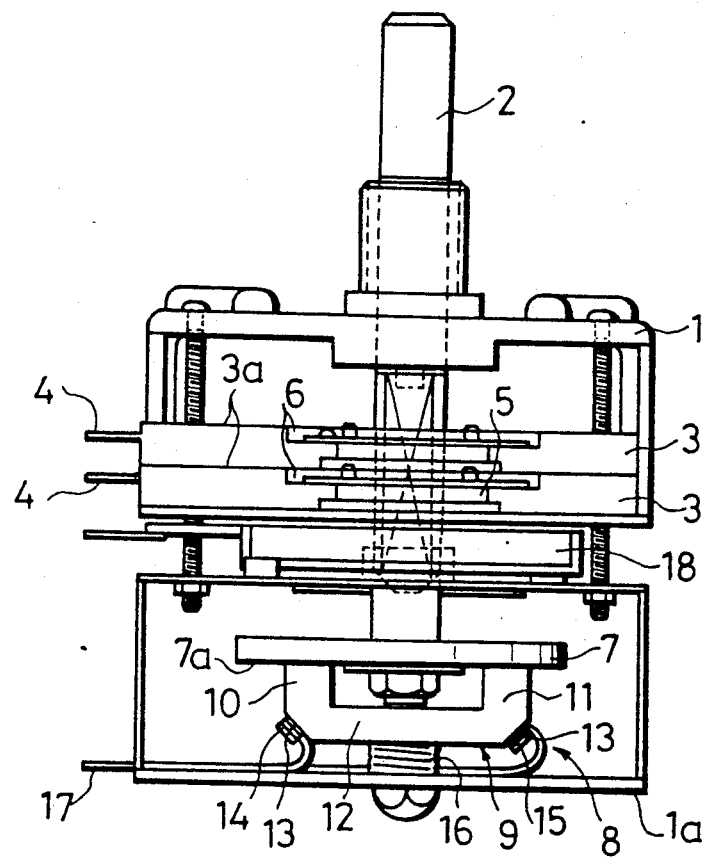
FIGS. 1 and 2 are a front view and a bottom view, respectively, illustrating a first embodiment of the present invention.
Figure 2:
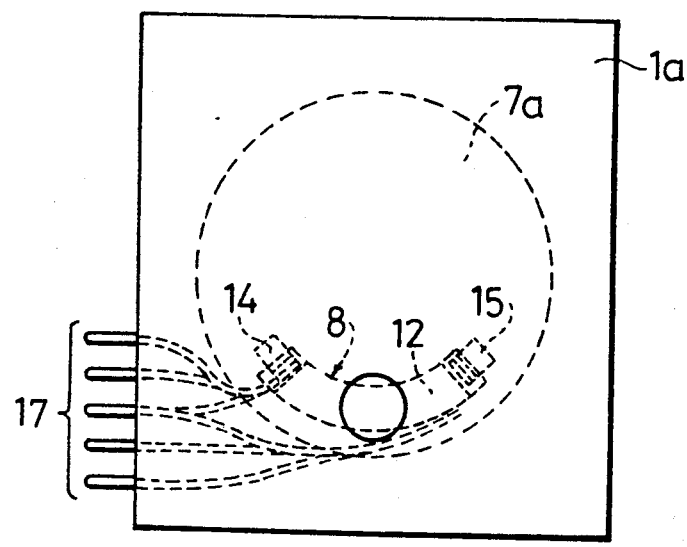

In FIG. 1, reference numeral 1 represents the main body of the device. This main body 1 of the device is an approximately cylindrical box, whose two extremities are closed, on the center line of which there is disposed a driving shaft 2.

This driving shaft 2 is supported rotatably around the axis thereof and the two extremities protrude up- and downward, traversing the main body 1 of the device.

In the lower part of the main body 1 of the device there are disposed 2 wafers having approximately a disk shape in a plan view. These wafers 3 are secured to the main body 1 of the device and held in a still state, when the driving shaft 2 is rotated. A plurality of contacts (conductors) (not shown in the figure) are arranged on the upper surfaces 3a of the wafers 3. Each of the contacts is connected with each of a plurality of terminals 4 (only one of them is shown for each of the wafers in the figure) disposed on the peripheral surfaces of the wafers.

On the center line of each of the wafers 3 a rotating plate 5 is engaged rotatably. This rotating plate 5 is secured to the driving shaft 2 stated above so as to be rotatable together with the driving shaft 2. Further there is disposed a conducting plate (conductor) 6 at a position on the rotating plate 5 corresponding to the upper portion of each of the wafers 3. These conducting plates 6 are formed in a shape, in which they can be brought selectively into contact with the plurality of contacts disposed on the upper surfaces 3a of the wafers 3 described above, when the rotating plates 5 are rotated. In this way the conduction state between different terminals 4 on the wafers 3 is switched over (with the rotation), depending on the contact and the separation between these conducting plates 6 and these contacts.

On the other hand, there is disposed a supporting frame 1a under the main body 1 of the device. A driving plate 7 having a disk shape in a plan view is mounted on the lower end portion of the driving shaft 2 surrounded by this supporting frame 1a.

Further an ultrasonic motor 8 driving the driving plate 7 stated above so as to rotate it around the axial line of the driving shaft 2 is mounted on the lower surface 7a of the driving plate 7.

This ultrasonic motor 8 is described in Japanese Utility Model Application Sho 63-137495, filed previously by the present applicant. Hereinbelow it will be explained, referring to FIGS. 1 and 2.

In these figures, reference numeral 9 represents a vibrator. This vibrator 9 consists of two leg portions 10 and 11 standing vertically downward on the lower surface of the driving plate 7 stated above and having a same length and a trunk portion 12 linking the lower extremities of the leg portions 10 and 11. These leg portions 10 and 11 as well as the trunk portion 12 are rectangular pillars made of elastic material, all of which have approximately square cross-sections. The trunk portion 12 is bent to form an arc shape in a plane perpendicular to the longitudinal direction of the leg portions 10 and 11 and the center of curvature thereof is located so as to be in accordance with the center of the driving plate 7, i.e. the center of the driving shaft 2.

Although the dimensions of the leg portions 10 and 11 as well as the trunk portion can be determined appropriately, in the device shown as an example in the figures, they are made of aluminum and each of the leg portions 10 and 11 has 5 mm square cross-section and a length of 10 mm. The trunk portion has a 5 mm square cross-section, the length of the arc measured along the center line is 31 mm; and the radius of curvature is 100 mm. Other than aluminum, the vibrator 9 may be made of inorganic materials such as duralumin, iron, brass, stainless steal, etc. as well as organic materials such as polyimide resin, nylon, etc.

The two corner portions of the vibrator 9 are chamfered so as to have a surface forming an angle of 45° with respect to each of the leg portions 10 and 11 as well as the trunk portion 12. On the mounting surfaces 13 thus formed are mounted piezo-electric elements (vibrating elements) 14 and 15 having a rectangular pillar shape. For these piezo-electric elements 14 and 15 multi-layered type piezo-electric actuators or piezo-electric ceramics can be used and they are so disposed that they are extended and contracted in the direction perpendicular to each of the mounting surfaces 13 by an alternating voltage applied from a power supply not shown in the figure. In the example shown in the figure each of the piezo-electric elements 14 and 15 has a 5 mm square cross-section and a length of 9 mm and it is secured to the mounting surface 13 by using adhesive.

Further there is disposed a spring 16 between the trunk portion 12 and the supporting frame 1a. The vibrator 9 is energized by this spring 16 so that the extremity portions of the leg portions 10 and 11 are brought into contact with the driving plate 7 with pressure.

In the figure reference numeral 17 is a terminal for applying the alternating voltage to the piezo-electric elements 14 and 15, and reference numeral 13 is a sensor for detecting the rotating amount of the driving shaft 2 stated above.

Next the action of the switch thus constructed will be explained.

In order to rotate the rotating plate 5 to switch over the conduction state between the wafers 3 and the terminals 4, an alternating voltage, which is in an ultrasonic frequency region, is applied to either one or both of the piezo-electric elements 14 and 15 to excite the vibrator 9. In this way a longitudinal vibration in the longitudinal direction of the leg portions 10 and 11 is combined with a bending vibration in the bending direction of the trunk portion 12 to produce an elliptic vibration rotating in a specified direction at the extremity portion of each of the leg portions 10 and 11.

Since this elliptic vibration acts in the tangential directions at the two extremities of the trunk portion 12, the driving plate 7 is driven so as to be rotated in either one of the directions around the axial line of the driving shaft 2 and in this way the driving shaft 2 is rotated. At this time the rotational direction of the driving shaft 2 stated above can be controlled, because the rotational direction of the elliptic vibration can be changed by varying the selection state of the piezo-electric elements 14 and 15, the phase of the alternating voltage applied to the piezo-electric elements 14 and 15, etc.

Further, in order to stop the rotating plate 5 at a predetermined position, the rotational angle of the driving shaft 2 is detected by means of the sensor 18 and current supply to the piezo-electric elements 14 and 15 is interrupted at a point of time, where the rotational angle of the driving shaft 2 reaches a predetermined value. Then the rotation of the driving plate is suppressed by the friction force acting between the extremities of the leg portions 10 and 11 energized towards the driving plate 7 side by the spring 16 and the lower surface 7a of the driving plate 7. In this way, the driving shaft 2 is rapidly stopped at the predetermined position so that the rotation of the driving shaft 2 is stopped, in the state where the desired terminals 4 are in the conduction state through the conducting plate 6.

As explained above, by the switch described in the present embodiment, since it is possible to switch over the conduction state between the terminals 4 by vibrating the ultrasonic motor 8 in the ultrasonic frequency region, no electromagnetic noise is produced. Therefore it can be used without any problem also in precision apparatuses and electronic devices, which are relatively easily affected by electromagnetic noise. Further, since working sound of the ultrasonic motor 8 itself is in the ultrasonic frequency region outside of the audible region, the quietness of the device is improved.

Still further, since the rotation of the driving shaft 2 is rapidly stopped by the friction force between the ultrasonic motor 8 and the driving plate 7, when current supply to the ultrasonic motor 8 is interrupted, the response property to the control signal is improved. As the result, the control mechanism can be simplified. In addition, in the state where current supply to the ultrasonic motor 8 is interrupted, since the rotation of the driving shaft 2 can be suppressed by the friction force described above, it is not necessary to dispose any stopping mechanism for the driving shaft 2. Consequently, it is possible to realize remarkable reduction in size and weight of the device as well as a reduction in cost.

Although only one ultrasonic motor 8 is used in the above embodiment, the present invention is not restricted thereto, but modifications may be made suitably, such that a plurality of ultrasonic motors may be disposed on the lower surface 7a of the driving plate 7, depending on the driving torque, etc. of the driving shaft 2, they may be disposed so as to put the driving plate 7 therebetween.

EMBODIMENT 2

Next the second embodiment of the present invention will be explained, referring to FIGS. 3 and 4. The constituent members identical to those described in EMBODIMENT 1 are represented by the same reference numerals and explanation thereof will be omitted.

Figure 3:
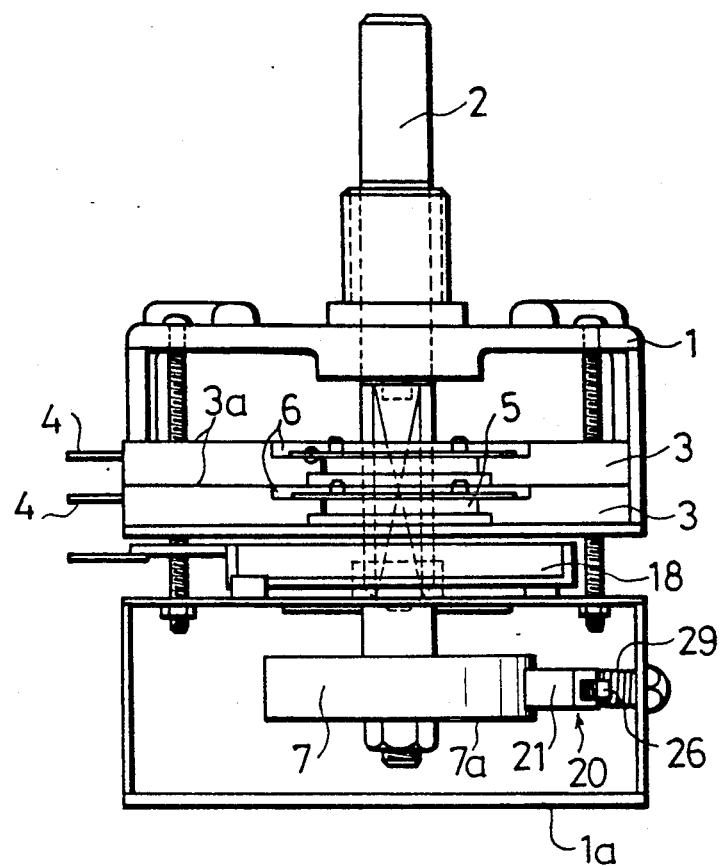
FIGS. 3 and 4 are a front view and a bottom view, respectively, illustrating a second embodiment of the present invention.
Figure 4:
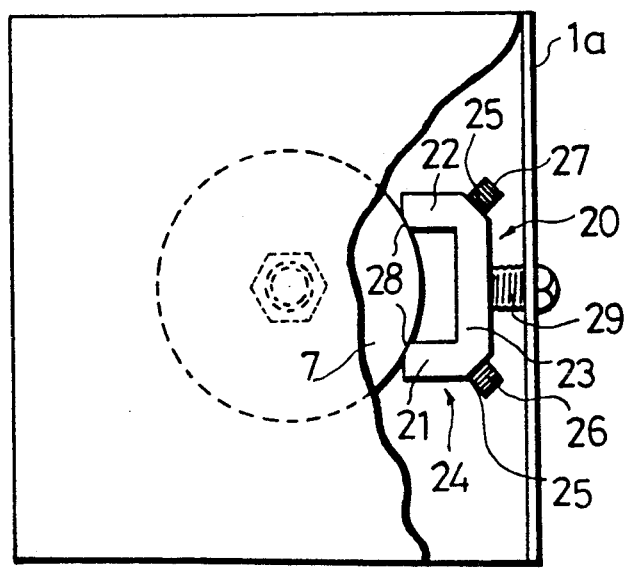

As indicated in FIGS. 3 and 4, in the present embodiment the ultrasonic motor 20 is disposed on the peripheral surface of the driving plate 7. This ultrasonic motor 20 is that described in Japanese Utility Model Application Sho 63-137495, filed previously by the present applicant. Hereinbelow the construction thereof will be explained.

In FIGS. 3 and 4, reference numerals 21 and 22 represent leg portions, which are parallel to each other and 23 is a trunk portion linking the extremities of the leg portions 21 and 22. These leg portions 21 and 22 as well as the trunk portion 23 are made of elastic material, all of which have approximately square cross-sections, and the whole is formed approximately in a U shape so as to constitute a vibrator 24.

Although the dimensions and the material of the leg portions 21 and 22 as well as the trunk portion 23 can be determined appropriately, in the device shown as an example in the figure, they are made of aluminium; the trunk portion 23 has a 5 mm square cross-section and a length of 26 mm; and each of the leg portions 21 and 22 has a 5 mm square cross-section and a length of 15 mm. Apart from aluminium, the vibrator 24 may be made of metallic materials such as duralumin, iron, brass, stainless steal, etc.; inorganic materials such as alumina, glass, silicium carbide, etc. as well as organic materials such as polyimide resin, nylon, etc.

The corner portions of the vibrator 24 are chamfered so as to have a surface forming an angle of 45° with respect to each of the leg portions 21 and 22 as well as the trunk portion 23. On the mounting surfaces 25 thus formed are mounted piezo-electric elements (vibrating elements) 26 and 27 by means of adhesive, etc. For these piezo-electric elements 26 and 27 multi-layered type piezo-electric actuators or single plate type piezo-electric ceramics can be used and they are so disposed that they are subjected to ultrasonic vibration by applying an alternating voltage from a power supply not shown in the figure in the direction perpendicular to each of the mounting surfaces 25. Although the dimensions of the piezo-electric elements 26 and 27 can be determined appropriately just as the leg portions 21 and 22, etc., in the example shown in the figure each of the piezo-electric elements has a 5 mm square cross-section and a length of 9 mm.

On each of the corner portions, which are opposite to each other, of the extremities of the leg portions 21 and 22 stated above, is formed an inclined surface 28 so that they become narrower with decreasing distance from the extremity.

Further there is disposed a spring 29 between the trunk portion 23 and the supporting frame 1a. The vibrator 24 is energized by this spring 29 towards the center side of the driving plate 7.

In the switch constructed as described above, just as the switch described in EMBODIMENT 1, the vibrator 24 is excited by applying an alternating voltage to either one or both of the piezo-electric elements 26 and 27 of the ultrasonic motor 20. In this way a longitudinal vibration in the longitudinal direction of the leg portions 21 and 22 is combined with a bending vibration in the longitudinal direction of the trunk portion 23 to produce an elliptic vibration rotating in a specified direction at the extremity portion of each of the leg portions 21 and 22.

In this way, the driving plate 7, which is brought into contact with the inclined surface 28 of the extremity of each of the leg portions 21 and 22, is kicked in one of the tangential directions of the peripheral surface, depending on the direction of the rotation of the elliptic vibration described above, so as to be rotated around the axial line of the driving shaft 2.

The rotational direction of the driving plate 7 can be controlled by varying the selection state of the piezo-electric elements 26 and 27, the phase of the alternating voltage applied to the piezo-electric elements 26 and 27, etc. just as in EMBODIMENT 1. Further, in order to stop the rotation of the rotating plate 5, the rotation of the driving plate 7 is suppressed by the friction force acting between the peripheral surface of the driving plate 7 and the inclined surfaces 28 of the leg portions 21 and 22 energized towards the center side of the driving plate 7 by a spring 29 by interrupting current supply to the piezo-electric elements 26 and 27 on the basis of a signal coming from the sensor 18.

In this way, also by the switch in this embodiment, just as in EMBODIMENT 1 described previously, since it is possible to rotate the driving shaft 2 by exciting the ultrasonic motor 20 in the ultrasonic vibration, it can be used without any problem also in apparatuses, which are easily affected by electromagnetic noise; working sound of the device is suppressed; and thus the quietness of the device is improved. Further it is possible to realize reduction in size of the device as well as a reduction in cost.

In addition, in the present embodiment, particularly since the ultrasonic motor 20 is disposed on the peripheral surface side of the driving plate 7, when the outer diameter of the driving plate 7 is kept constant, a driving force of the ultrasonic motor necessary for rotating the driving plate with a predetermined torque may be smaller than that required in the case where the driving plate 7 is driven at a position, which is closer to the center than the peripheral surface of the driving plate 7, as in EMBODIMENT 1. Further the holding torque of the driving plate 7, when the force of the spring 29 energizing the vibrator 20 is set so as to be equal to that of the spring 16 used in EMBODIMENT 1 described previously, is greater.

EMBODIMENT 3

Next the third embodiment of the present invention will be explained, referring to FIGS. 5 and 6.

In these figures, reference numeral 30 represents the main body of the device. This main body 30 of the device is formed in a box shape made of insulating material, on the lower surface of which there are disposed 6 terminals (conductors), which are arranged with an appropriate interval in 3 rows in the longitudinal direction (left and right direction in FIG. 1) of the main body 30 of the device and 2 rows in the width direction (direction perpendicular to the sheet of paper in FIG. 1).

The extremity of each of terminals 31 protrudes through the lower surface of the main body 30 of the device. At the extremity of each of the terminals 30 on the main body side is formed a contact 32, which is approximately U shaped in the side view viewed in the longitudinal direction of the main body 30 of the device.

In the interior of the main body 30 of the device there are disposed two rods parallel to each other, extending in the longitudinal direction of the main body 30 of the device. On these rods 33 a holder 34 is mounted through liners 35 so as to be movable in the axial direction of the rods 33.

At positions of the lower part of this holder 34, opposite to the contacts 32 described above, there are disposed two sliders 36 having a plate shape. These sliders 36 are made of a conductive material, each of which bridges two of these contacts 32, adjacent to each other in the longitudinal direction of the main body 30 of the device to shortcircuit them so that the conduction state among these terminals 31 is switched over. Further, on the upper surface of the holder 34 is formed a knob 37 for manipulating manually the holder 34 stated above, the extremity of which protrudes upward through the upper surface of the main body 30 of the device.

A motor mounting hole 38 is formed in the holder 34, in which an ultrasonic motor 39 is mounted.

This ultrasonic motor 39 is that described in Japanese Utility Model Application Sho 63-137495, filed previously by the present applicant. Hereinbelow the construction thereof will be explained.

The ultrasonic motor 39 consists of a vibrator 42 comprising a mounting part 41, which is triangular in a side view viewed in the width direction of the main body 30 of the device, secured to the upper part of a pillar shaped leg portion 40, and two piezo-electric elements (vibrating elements) 43 and 44 mounted on this mounting part 41 of the vibrator 42.

The vibrator 42 is made of an elastic material having an appropriate rigidity and elasticity. Usually a metal such as aluminium, etc. is used therefor, but it can be selected suitably among ceramics, resins, etc., other than metals.

The leg portions 40 of the vibrator 42 has a rectangular cross-section (square in the example indicated in the figure) and the lower extremity thereof is formed in a smooth plane, which is perpendicular to the axial line and serves as a contacting surface 45 brought into contact with the upper surface of the bottom of the main body 30 of the device.

On the other hand, the mounting part 41 of the vibrator 42 has two inclined surfaces 46, which are inclined in directions opposite to each other with a same angle (45° in the figure) with respect to the contacting surface 45 of the leg portion 40. The piezo-electric elements 43 and 44 described above are adhered to these inclined surfaces 46 by means of adhesive.

Each of the piezo-electric elements 43 and 44 is formed by superposing piezo-electric ceramic plates polarized in their thickness direction, putting an electrode therebetween, so that it is subjected to a longitudinal vibration in the direction perpendicular to the relevant inclined surface 46 by applying an alternating voltage thereto.

Although the dimensions of the vibrator 42 as well as the piezo-electric elements 43 and 44 may be determined appropriately, in the example indicated in the figure, the dimensions of the vibrator 42 are so chosen that the leg portion 40 has a 5 mm square cross-section and the whole is 12.5 mm high, and those of the piezo-electric elements 43 and 44 have a 5 mm square cross-section and are 9 mm high. Further an antifriction material made of a composite material of polyimide resins may be adhered to the contacting surface 45 of the leg portion 40 to reduce the friction in order to try to obtain a smooth sliding.

In addition, the vibrator 42 stated above is energized always towards the lower portion of the main body 30 of the device by a spring 47 mounted on the holder 34 described above.

In a switch constructed as described above, when the vibrator 42 is excited by applying an alternating voltage in an ultrasonic frequency region to either one or both of the piezo-electric elements 43 and 44 of the ultrasonic motor 39, just as described previously in EMBODIMENTS 1 and 2, at the lower extremity of the leg portion 40 a longitudinal vibration is combined with a bending vibration to generate an elliptic vibration, which rotates in a specified direction, so that driving force along the axial direction of the rods 33 acts between the contacting surface 45 and the upper surface of the bottom of the main body 30 of the device.

Figure 5:
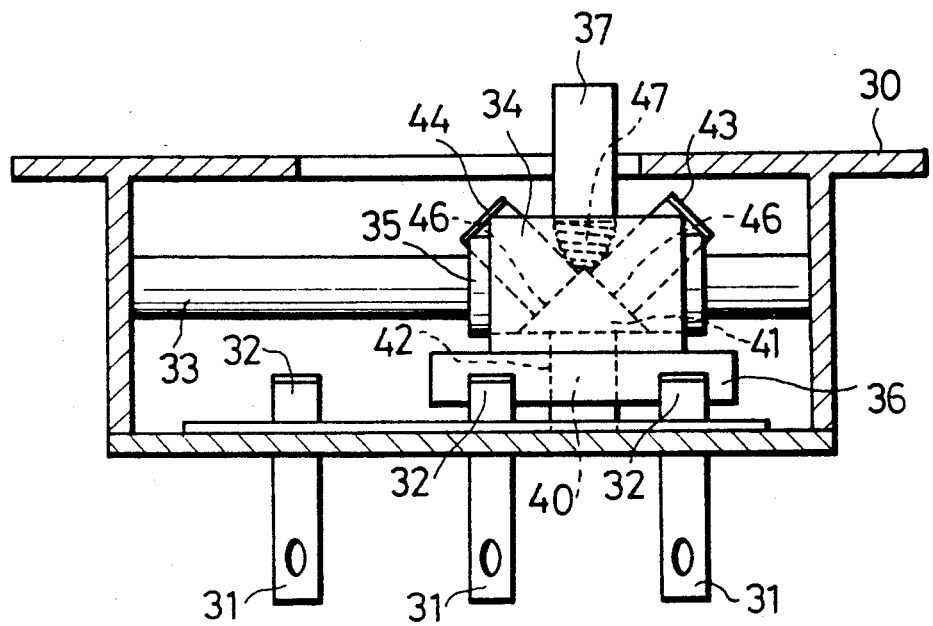
FIGS. 5 and 6 are a longitudinal cross-sectional view and a transversal cross-sectional view, respectively, illustrating a device, which is a third embodiment of the present invention.
Figure 6:
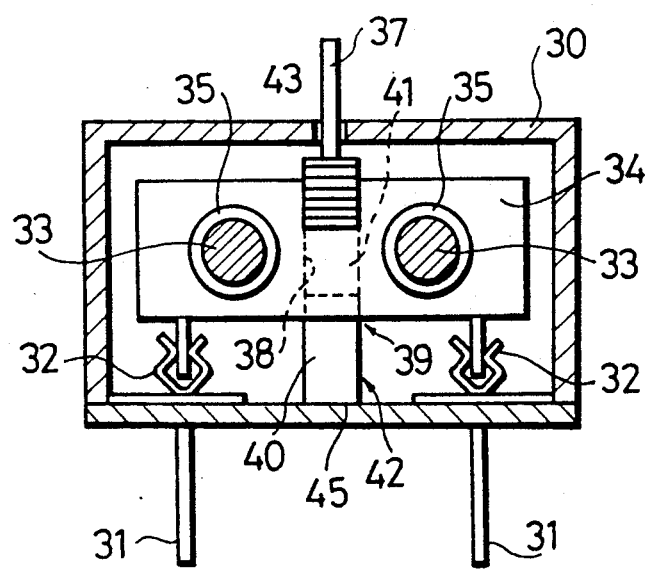

In this way the holder 34 is moved in either one of the axial directions of the rods 33, corresponding to the direction of the rotation of the elliptic vibration of the leg portions 40 so that each of the sliders 36 bridges two of the contacts 32 arranged in the axial direction of the relevant rod 32, which are adjacent to each other (contacts 32 at the center and on the right side in FIG. 5). In this way the terminals 31 corresponding to these contacts 32 become conductive through the slider 36.

At this time, the direction of the movement of the holder 34 can be controlled by the selection state of the piezo-electric elements 43 and 44, the phase of the alternating voltage applied thereto, etc., just as in EMBODIMENTS 1 and 2. Further, in order to stop the holder 34 at a predetermined position, the duration of current supply to the piezo-electric elements 43 and 44 is controlled. That is, the current supply to the piezo-electric elements 43 and 44 is stopped after a predetermined duration and the holder 34 is stopped by the friction force between the contacting surface 45 of the leg portion 40 and the upper surface of the bottom of the main body 30 of the device to suppress the movement thereof.

As explained above, also in the switch in the present embodiment, just as in EMBODIMENTS 1 and 2 described previously, since the conduction state between the terminals 31 can be switched over by moving the holder 34 by means of the ultrasonic motor 39, it can be used without any problem for apparatuses, which are affected easily by electromagnetic noise, and the quietness of the device can be improved.

Further, since it is possible to stop the holder 34 or to hold it at the predetermined position by utilizing the friction force between the ultrasonic motor 39 and the main body 30 of the device, it is possible to intend to simplify the control mechanism and to reduce the size and the cost of the device by omitting the stopping mechanism.

Still further, since the holder 34 can be moved directly linearly in the axial direction of the rods 33 by means of the ultrasonic motor 39, any mechanism required for converting the rotational movement into linear one in the case where a rotary type motor is used becomes unnecessary and thus it is realized to reduce further the size and the cost of the device.

Furthermore, although particularly the ultrasonic motor 20 is supposed to have a single leg portion 40 in the present embodiment, the present invention is not restricted thereto, but it is a matter of course that an ultrasonic motor comprising two leg portions linked by a trunk portion so that the whole has approximately a U shape, as described in Japanese Patent application Hei 1-55572 filed previously by the present applicant, may be used as well.

In addition, the present invention is not restricted to the construction, in which the conduction state among conductors such as terminals is switched over by converting a rotational movement into a linear movement, as indicated as examples in the above embodiments, but it can be applied also to switches of various structures such as e.g. a switch, in which the conduction state is switched over by making a conductor pivot as a seesaw, etc.

As explained above, according to the present invention, since the conduction state can be switched over by driving force of an ultrasonic motor, no electromagnetic noise is produced and therefore this switch can be used without any problem also in precision apparatuses and electronic devices, which are relatively easily affected by electromagnetic noise.

Further, since working sound of the ultrasonic motor itself is in the ultrasonic frequency region outside of the audible region, the quietness of the device is improved.

Still further, since the movement of the conductor is stopped to be suppressed by utilizing the friction force acting between a constituent member subjected to the driving force of the ultrasonic motor and the last, the response of the device to a control signal controlling the movement of the conductor is improved and the control mechanism can be simplified. At the same time it becomes unnecessary to dispose any stopping mechanism for holding the conductor at a predetermined position and as the result, it is possible to realize remarkable reduction in size and weight of the device and a reduction in cost.

EMBODIMENT 4

Figure 7:
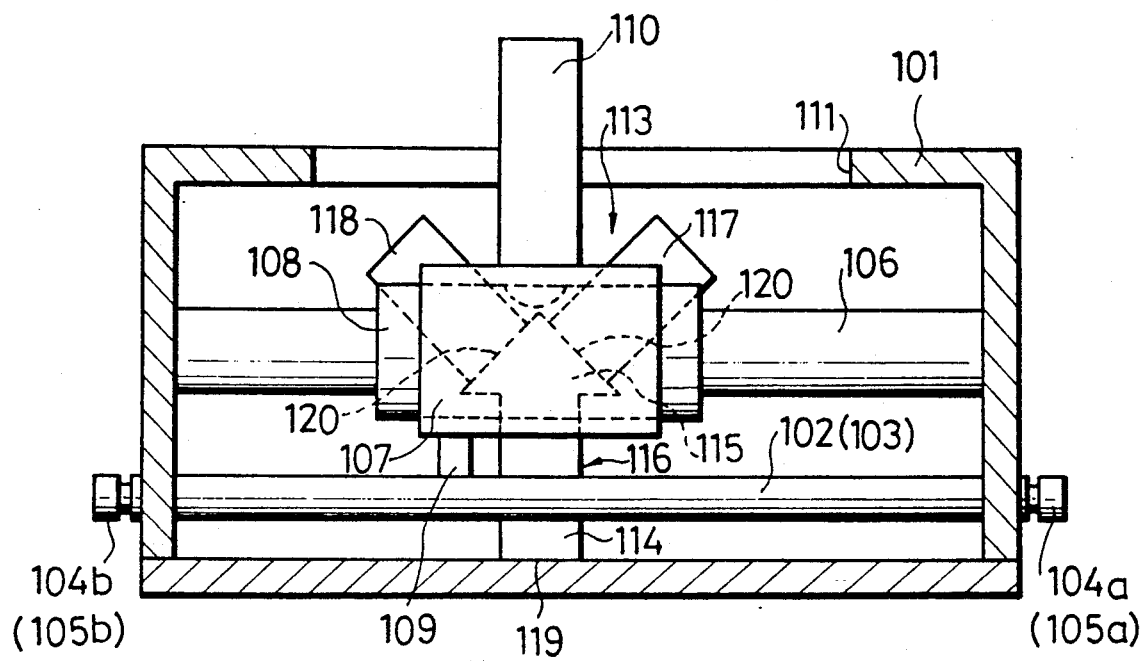
FIGS. 7 and 8 are a cross-sectional view along the extension of a resistor and a side view, respectively, illustrating a fourth embodiment of the present invention.
Figure 8:
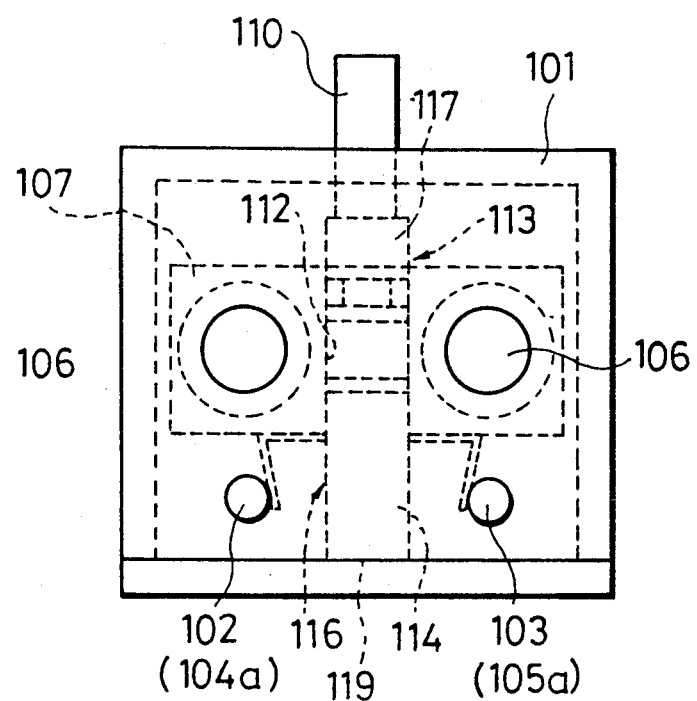

Next a fourth embodiment of the present invention will be explained, referring to FIGS. 7 and 8.

In these figures, reference numeral 101 represents a main body of the device. This main body 101 of the device is formed in a box shape, made of insulating material, in the interior of which a resistor 102 and a conductor 103 extending in the longitudinal direction of the main body 101 of the device (left and right direction in FIG. 7) are disposed with a predetermined interval in the width direction of the main body 101 of the device (left and right direction in FIG. 8).

The resistor 102 is a conductor having a suitable electric resistance and a cylindrical shape, the two extremities of which are supported by side walls of the main body 101 of the device by being engaged therewith. In addition, at the two extremities of the resistor 102 there are disposed terminals 104a and 104b protruding outward in the longitudinal direction of the main body 101 of the device.

On the other hand, the conductor 103 stated above is made of a conductive material in a cylindrical shape, which material has an electric resistivity smaller than that of the resistor 102, the two extremities of which are supported by side walls of the main body 101 of the device by being engaged therewith, and in addition, at the two extremities thereof there are disposed terminals 105a and 105b similarly to the resistor 102.

Further, above the resistor 102 and the conductor 103 within the main body 101 of the device there are disposed two rods 106 parallel to the resistor 102 and a holder 107 having a rectangular parallelepiped shape is mounted on these rods 106 through a liner 108 slidably in the axial direction of the rods 106.

On the lower surface of this holder 107 is mounted a slider 109. This slider 109 is made of a conductive plate bent approximately in a U shape, the two extremity portions of which are extended under the holder 107 so as to be in contact with the peripheral surfaces of the resistor 102 and the conductor 103, respectively. In addition, a knob 110 for manipulating manually the holder 107 is formed on the upper surface of the holder 107 and the extremity thereof protrudes upward, traversing a cut-off portion 111 formed in the upper surface of the main body 101 of the device.

An actuator mounting hole 112 is formed in the holder 107 and an ultrasonic linear motor (hereinbelow called simply linear motor) 113 is mounted in this actuator mounting hole 112.

The linear motor 113 consists of a vibrator 116 comprising a mounting part 115, which is triangular in the side view viewed in the width direction of the main body 101 of the device, secured to the upper part of a pillar shaped leg portion 114, and two piezo-electric elements (vibrating elements) 117 and 118 mounted on this mounting part 115 of the vibrator 116.

The vibrator 116 is made of an elastic material having an appropriate rigidity and elasticity. Usually a metal such as aluminium, etc. is used therefor, but it can be selected suitably among ceramics, resins, etc., other than metals.

The leg portion 114 of the vibrator 116 has a rectangular cross-section (square in the example indicated in the figure) and the lower extremity thereof is formed in a smooth plane, which is perpendicular to the axial line and serves as a contacting surface 119 brought into contact with the upper surface of the bottom of the main body 101 of the device.

On the other hand, the mounting part 115 of the vibrator 116 has two inclined surfaces 120, which are inclined in directions opposite to each other with a same angle (45° in the figure) with respect to the contacting surface 119 of the leg portion 114. The piezo-electric elements 117 and 118 described above are adhered to these inclined surfaces 120 by means of adhesive.

Each of the piezo-electric elements 117 and 118 is formed by superposing piezo-electric ceramic plates polarized in their thickness direction, putting an electrode therebetween, so that it is subjected to a longitudinal vibration in the direction perpendicular to the relevant inclined surface 120 by applying an alternating voltage thereto.

Although the dimensions of the vibrator 116 as well as the piezo-electric elements 117 and 118 may be determined appropriately, in the example indicated in the figure, the dimensions of the vibrator 116 are so chosen that each of the leg portions 114 has a 5 mm square cross-section and the whole is 12.5 mm high, and those of the piezo-electric elements 117 and 118 have a 5 mm square cross-section and are 9 mm high. Further an antifriction material made of a composite material of polyimide resins may be adhered to the contacting surface 119 of the leg portion 114 to reduce the friction in order to try to obtain a smooth sliding.

In addition, the vibrator 116 is energized always towards the lower portion of the main body 101 of the device by a plate spring 121 sealed in the upper portion of the actuator mounting hole 112.

In a variable resistor constructed as described above, when the vibrators 116 is excited by applying an alternating voltage in an ultrasonic frequency region to either one or both of the piezo-electric elements 117 and 118 of the linear motor 113, at the lower extremity of the leg portion 114 a longitudinal vibration is combined with a bending vibration to generate an elliptic vibration, which rotates in a specified direction, so that driving force along the axial direction of the rods 106 acts between the contacting surface 119 and the upper surface of the bottom of the main body 101 of the device.

In this way the holder 107 is moved in either one of the axial directions of the rods 106, corresponding to the direction of the rotation of the elliptic vibration of the leg portions 114 so that the contacting position between the resistor 102 and the slider 109 varies with the movement of the holder 107 and therefore the resistance between the terminals 104a, 104b on the resistor 102 side and the terminals 105a, 105b on the conductor 103 side varies together therewith.

At this time, the direction of the movement of the holder 107 can be controlled by the selection state of the piezo-electric elements 117 and 118, the phase of the alternating voltage applied thereto, etc.

Further, in order to stop the holder 107 at a predetermined position, the current supply to the piezo-electric elements 107 and 108 is stopped at a point of time where the resistance between the terminal reaches a predetermined value. In this way, the linear motor 113 is stopped rapidly by the friction force acting between the contacting surface 119 of the leg portion 114 of the linear motor 113 and the upper surface of the bottom of the main body 101 of the device to suppress the movement thereof. In addition, the control of the duration of the current supply to the piezo-electric elements 107 and 108 is not always based on the resistance between the terminals, but it may be effected simply by measuring the duration of the current supply thereto.

Furthermore, in the case where the resistance is varied by manipulating manually the holder 107, the knob 110 may be manipulated with a force exceeding the friction force between the contacting surface 119 of the linear motor 113 and the upper surface of the bottom of the main body 101 of the device.

As explained above, in the variable resistor in the present embodiment, since the resistance between the terminals can be changed by moving the holder 107 by means of the ultrasonic vibration of the linear motor 113, no electromagnetic noise is produced and consequently it is not necessary to take measures against noise for apparatuses, in which variable resistors are used.

Further, since the slider is linearly moved by the linear movement of the linear motor 113, no mechanism for changing the direction of movement of the actuator is required. For this reason, it is possible to realize reduction in size and weight of the variable resistor and to try to lower the fabrication cost.

Still further, concerning the positioning of the slider 109, since it is possible to stop the movement of the slider 109 or to hold it at the predetermined position by utilizing the friction force between the linear motor 113 and the main body 101 of the device, influences of the inertia of the actuator itself are reduced remarkably with respect to those observed in the case where a prior art rotary type motor is used. In addition, since there exists no driving mechanism, as used by the prior art techniques, between the actuator and the slider 109, these influences of the inertia and accumulated errors are eliminated. As the result, the response to the control signal is further improved and the resolving power is increased.

Still further, since the slider 109 is held by the friction force between the linear motor 113 and the main body 101 of the device, if this friction force is set so as to be in a region where it doesn't exceed the force necessary for an operator to manipulate manually the slider 109, the slider 109 can be manipulated selectively either manually or by means of the linear motor 113.

Furthermore, although particularly the ultrasonic motor 113 is supposed to have a single leg portion 114 in the present embodiment, the present invention is not restricted thereto, but it is a matter of course that a linear motor comprising two leg portions linked by a trunk portion so that the whole has approximately a U shape may be used as well.

In addition, in the variable resistor in the present embodiment, by controlling the phase, the frequency, etc. of the alternating voltage applied to the piezo-electric elements 117 and 118 on the basis of variations in the resistance between the terminals, it is possible inversely to control the direction and the speed of the movement as well as the position of the holder 107. Consequently it can be used as an electromagnetic solenoid executing opening and shutting of a valve by disposing a shaft member extending along the direction of movement of the linear motor 113 in the holder 107 and by moving it in the axial direction of the holder 107 together therewith.

As explained above, according to the present invention, since an ultrasonic linear motor is used as an actuator for moving the slider, various effects can be obtained as follows:

(1) Since the ultrasonic linear motor produces no electromagnetic noise, it is not necessary to take measures against noise for apparatuses, in which the variable resistor is incorporated.

(2) Since the slider can be move directly linearly along the resistor by the linear movement of the ultrasonic linear motor, it is not necessary to dispose any driving mechanism for changing the direction of movement of the actuator and therefore it is possible to realize remarkable reduction in size and weight of the variable resistor or lowering in the fabrication cost therefor.

(3) It is possible to suppress the movement of the slider by using the friction force produced between the ultrasonic linear motor and a member subjected to the force thereof and further the driving mechanism between the actuator and the slider can be significantly omitted. For this reason, influences of the inertia at positioning the stop of the slider are significantly reduced; the response to the control signal for the actuator is improved; and further accumulated errors in the driving system from the actuator to the slider are considerably decreased so that the resolving power is increased.

(4) By setting the friction force suppressing the movement of the slider in an appropriate region it is possible to manipulate the slider selectively either manually or by means of the actuator without disposing any special mechanism for removing the linkage between the slider and the actuator.

We claim:

1. An electronic component comprising in combination an ultrasonic linear motor and an electronic part including a slider coupled to and moveable by said ultrasonic linear motor comprising:
   a vibrating member formed of an elastic material and including two parallel legs and a body connecting said legs;
   a pair of vibration sources mounted at opposite ends of said body for applying vibration to said vibrating member, wherein a longitudinal vibration and a bending vibration are generated in each leg by the vibration sources, and wherein said electronic part is a switch comprising a plurality of conductors, at least one of said plurality of conductors being disposed so as to be freely contacted with and separated from the other ones of said plurality of conductors, wherein said slider is moved by the vibrations in each leg so as to switch over the conduction state among said plurality of conductors.

2. An electronic component comprising in combination an ultrasonic linear motor and an electronic part including a slider coupled to and moveable by said ultrasonic linear motor comprising:
   a vibrating member formed of an elastic material and including two parallel legs and a body connecting said legs;
   a pair of vibration sources mounted at opposite ends of said body for applying vibration to said vibrating member, wherein a longitudinal vibration and a bending vibration are generated in each leg by the vibration sources, and wherein said electronic part is a variable resistor comprising terminals and a resistive element supported in operative relationship with said slider and brought into contact with said slider, said terminals being connected to said resistive element and said slider, wherein said slider is moved along said resistive elements by the vibrations in each leg to vary resistance between the terminals.

* * * * *